United States Patent Office 2,883,292
Patented Apr. 21, 1959

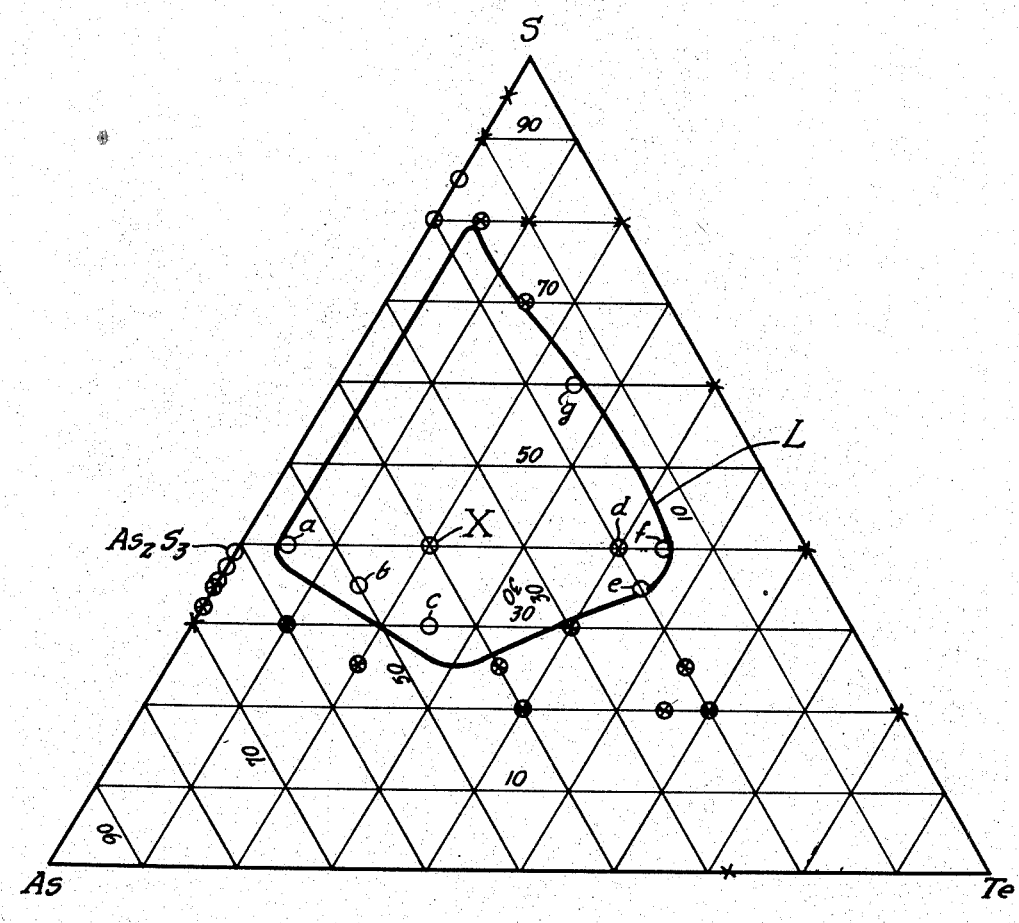

2,883,292

GLASS COMPOSITIONS

Joseph Jerger, Jr., Hempstead, N.Y., assignor to Servo Corporation of America, New Hyde Park, N.Y., a corporation of New York Application May 23, 1957, Serial No. 661,057

2 Claims. (Cl. 106—47)

This invention relates to glasses produced from ternary mixtures of the elements arsenic, sulfur and tellurium.

This application is a continuation-in-part of my copending application U.S. Serial No. 466,737, filed November 4, 1954, now abandoned.

In the indicated glass field, arsenic trisulfide has been known to produce homogeneous glasses. Such glasses have certain transmission properties selective to the infrared spectrum but their transmission cut-off does not extend as far into the infrared as is often desirable. For example, arsenic trisulfide glass will selectively transmit infrared radiation up to a wave length of about 12.5 microns as measured across a lens 2 mm. thick at 10% transmission.

Insofar as the present application is concerned, infrared rays are divided into two wavelength categories: (1) near infrared which includes wavelengths ranging from the end of the visible spectrum, i.e. about 0.7 micron, up to about 2 or 3 microns, and (2) far infrared which ranges from about 2.5 up to about 25 microns.

In detecting devices such as infrared spectrometers, gas analyzers, radiation pyrometers, bolometers, etc., it is important that the optical glass employed be selective to infrared radiation. It is desirable that the infrared device operate selectively and flexibly over as wide a wavelength range as possible, e.g. 2.5 to 16 microns, preferably in the range of about 8 to 13 microns in applications involving a transmission path from a point source of radiation through the atmosphere to an infrared detector.

In copending application Ser. No. 372,540 (now abandoned), filed August 5, 1953, in the name of Walter A. Fraser, binary mixtures of $As_2S_3$ and $As_2Te_3$ have been proposed and found to be desirably selective to infrared radiation, provided the binary mixtures are controlled over a narrow range of compositions. However, these glasses have certain limitations in that their response to the 8 to 13 micron range is not as high as desired.

I have found a more suitable range of glasses of a broader range of selectivity to the infrared spectrum based on the ternary composition As—S—Te. The amounts of elements present in the range do not correspond to the binary mixtures of the compounds $As_2S_3$ and $As_2Te_3$ and, therefore, are not as narrowly limited.

It is accordingly an object of the invention to provide a new field of glass compositions of the character indicated.

It is another object to provide improved infrared transmitting glasses.

A further object is to provide new glasses meeting the above objects and yet substantially opaque to visible light.

Still another object is to produce an improved infrared-transmitting glass of the character indicated and having a minimum proportion by weight of sulfur.

It is also an object to produce an improved infrared-transmitting glass of the character indicated and having a minimum proportion by weight of arsenic.

Other objects and various further features of novelty and invention will be pointed out or will occur to those skilled in the art from a reading of the following specification, in conjunction with the accompanying triaxial diagram. Said diagram depicts a field of glasses in which the substantial components are the elemental materials arsenic, sulfur and tellurium.

Briefly stated, I have found a new field of glasses comprising the fused-reaction products of various ternary mixtures of the elemental materials arsenic, sulfur, and tellurium. Previous thinking with regard to glasses of the character indicated was based on the knowledge that arsenic trisulfide ($As_2S_3$) and certain mixtures of arsenic trisulfide with arsenic tritelluride ($As_2Te_3$) were, of themselves, glassy and desirable mixtures of these compounds could be produced, but I have discovered that desirable glasses may be formed in substantial ternary regions not relying on the use of these compounds.

The compositions provided by the invention are shown by referring to the accompanying triaxial diagram in which the left-hand corner represents 100 percent arsenic (As), the right-hand corner represents 100 percent tellurium (Te), and the upper corner represents 100 percent sulfur (S). Any point in the diagram represents a definite composition; for example, point X represents a glass composition containing 40 percent arsenic, 40% sulfur, and 20% tellurium.

The area enclosed by solid line L in the diagram is empirically developed and covers compositions provided by the invention. Thus, the solid line delineates the border between compositions which will definitely form glasses and those which become crystalline. Close to this border, I have plotted certain specific compositions which have been made. The points within the area defined by line L are each identified by a small circle (O). Good glasses for the purposes of this invention will form from compositions anywhere in this area. Points outside the enclosed area are designated by a cross (×) represent purely crystalline compositions, and other points near the border are designated by a cross in a circle (⊗), and represent generally glassy materials with some crystalline content. Examples of good glasses indicated in the area enclosed by solid line L are as follows:

| Designation | Percent As | Percent S | Percent Te |
|---|---|---|---|
| a | 55 | 40 | 5 |
| b | 50 | 35 | 15 |
| X | 40 | 40 | 20 |
| c | 45 | 30 | 25 |
| d | 20 | 40 | 40 |
| e | 20 | 35 | 45 |
| f | 15 | 40 | 45 |
| g | 15 | 60 | 25 |

The diagram shows that compositions along the binary base line between arsenic and sulfur are glassy, as long as the percentage by weight of arsenic is less than substantially 62% and more than 13%; this is in accordance with the disclosure in my copending patent application Ser. No. 417,724, filed March 22, 1954. However, glasses formed by the binary As—S are limited as to cut-off wave length. The transmission properties are improved by the addition of tellurium and makes available a whole new group of compositions characterized by an improved combination of optical properties. If tellurium is added to replace part of the sulfur, the proportion by weight of sulfur can be reduced to as low a figure as about 25%, without devitrification of the melt. Also, the proportion by weight of arsenic can be reduced to substantially 13% without devitrification. As will be apparent from the area enclosed by solid line L the sulfur will range from about 25% to 78% by weight and the arsenic from about 13% to 56% by weight.

By maintaining at least about 4% telllurium in the composition, improved transmission properties are assured. As will be determined from the triaxial diagram, the tellurium content will range from about 4% to 48% by weight.

In producing the glass compositions provided by the invention, the following procedure is employed:

A glass composition corresponding to about 40% S, 40% As, and 20% Te (designated as composition "X" in the table above) is prepared by weighing out a total of 500 grams of the elements of substantially high purity in the comminuted or granulated form. The elements which are proportioned in accordance with the composition desired, are mixed and placed in a "Pyrex" container provided with a Pyrex cover adapted to enable a stirring rod to pass through the cover into the container and to enable the provision of an inert atmosphere of nitrogen, argon, etc.

The container is placed in a resistance wound vertical furnace and heated so that the temperature is raised to 200° C. as fast as possible and held there so as to melt the sulfur. At this point the mass is stirred in order to maintain a uniform mixture between the liquid sulfur and the solid selenium and tellurium and to facilitate a smooth reaction. Upon completion of stirring, the mass is further heated at a maximum rate to 450° C. and the mixture stirred again. At this point tellurium is molten. An exothermic reaction ensues an arsenic gradually reacts with the sulfur. The temperature is then raised to 500° C. and the melt stirred again until all of the arsenic has reacted, the stirring being continued for about an hour at this temperature.

The molten bath which weighs about 500 grams is then cooled down to about 450° C. at a rate of about 8° to 10° per hour while stirring at a decreasing rate to prevent striae and the stirrer removed. The melt is then cooled to 300° C. over a fifteen hour period, this rate of cooling being important to prevent striae. At the end of this period, the composition is cooled from 300° C. to 200° C. in two and one half hours.

After the temperature has reached 200° C., the composition is subjected to an annealing step comprising cooling it slowly to 155° C. over a 24 hour period. The power of the furnace is turned off and the composition finally furnace cooled to room temperature.

The glass product obtained from the Pyrex container is about 4 inches long and 2 inches in diameter. In subjecting the glass to a transmission test, a disc of about one quarter inch thick is first obtained from near the center of the cylindrical product by means of a diamond wheel. The slice is ground to a thickness of about 2 mm. in an essentially conventional manner.

The resulting test sample is then mounted in a sample holder and put into a sample beam of a Baird double beam recording infrared spectrophotometer (manufactured by the Baird Atomic Co. of Cambridge, Mass.). The instrument is operated to record the transmission of infrared radiation ranging from about 2 to 16 microns in wavelength. The results showed that this glass (40% As, 40% S and 20% Te) indicated a rather high cut-off at a wavelength of about 13 microns at a transmission of 10%.

Another glass composition similarly produced comprising about 20% As, 40% S and 40% Te (designated in the table as composition "d") indicated an even higher cut-off at a wavelength of about 13.3 microns for a transmission through the glass of 10%.

Still another glass comprising 55% As, 40% S and 5% Te (designated in the table as composition "a") indicated a cut-off in the neighborhood of about 12.75 microns.

It will be apparent from the foregoing glass compositions that tellurium is important as a third element in completing the ternary composition. For high transmission properties it is desirable to use more than the 4% minimum tellurium stated hereinbefore. A preferred composition is one comprising about 15% to 52% arsenic, about 32% to 70% sulfur and about 15% to 48% tellurium. It will be noted that glass compositions "X" and "d" which gave fairly high cut-off value fall within the foregoing preferred composition range.

While the invention is concerned substantially with the ternary compositions disclosed and claimed herein, it will be appreciated that small amounts of other ingredients may be tolerated in the ternary composition without adversely affecting substantially the transmission properties of the glass provided by the invention.

It will be seen that I have described improved glass compositions and have delineated a new field of glasses. My glasses have good infrared-transmitting properties and provide certain security in the visual range by virtue of their substantial opacity to visible light.

While I have described the invention in detail with particular reference to certain glasses, it will be understood that the invention is of broader scope and is defined in the claims which follow.

I claim:

1. An optical, infrared-transmitting glass composition comprising essentially a fused, vitreous, non-crystalline ternary mixture of arsenic, sulfur and tellurium is percentages by weight determined by the area enclosed substantially within solid line L of the accompanying triaxial diagram.

2. An optical, infrared-transmitting glass composition comprising essentially a fused, vitreous, non-crystalline ternary mixture of arsenic, sulfur and tellurium in percentages by weight of about 15% to 52% arsenic, about 32% to 70% sulfur, and substantially the balance about 15% to 48% tellurium.

References Cited in the file of this patent

UNITED STATES PATENTS 1,917,725     Lenander _____ July 11, 1933